United States Patent Office 2,741,989
Patented Apr. 17, 1956

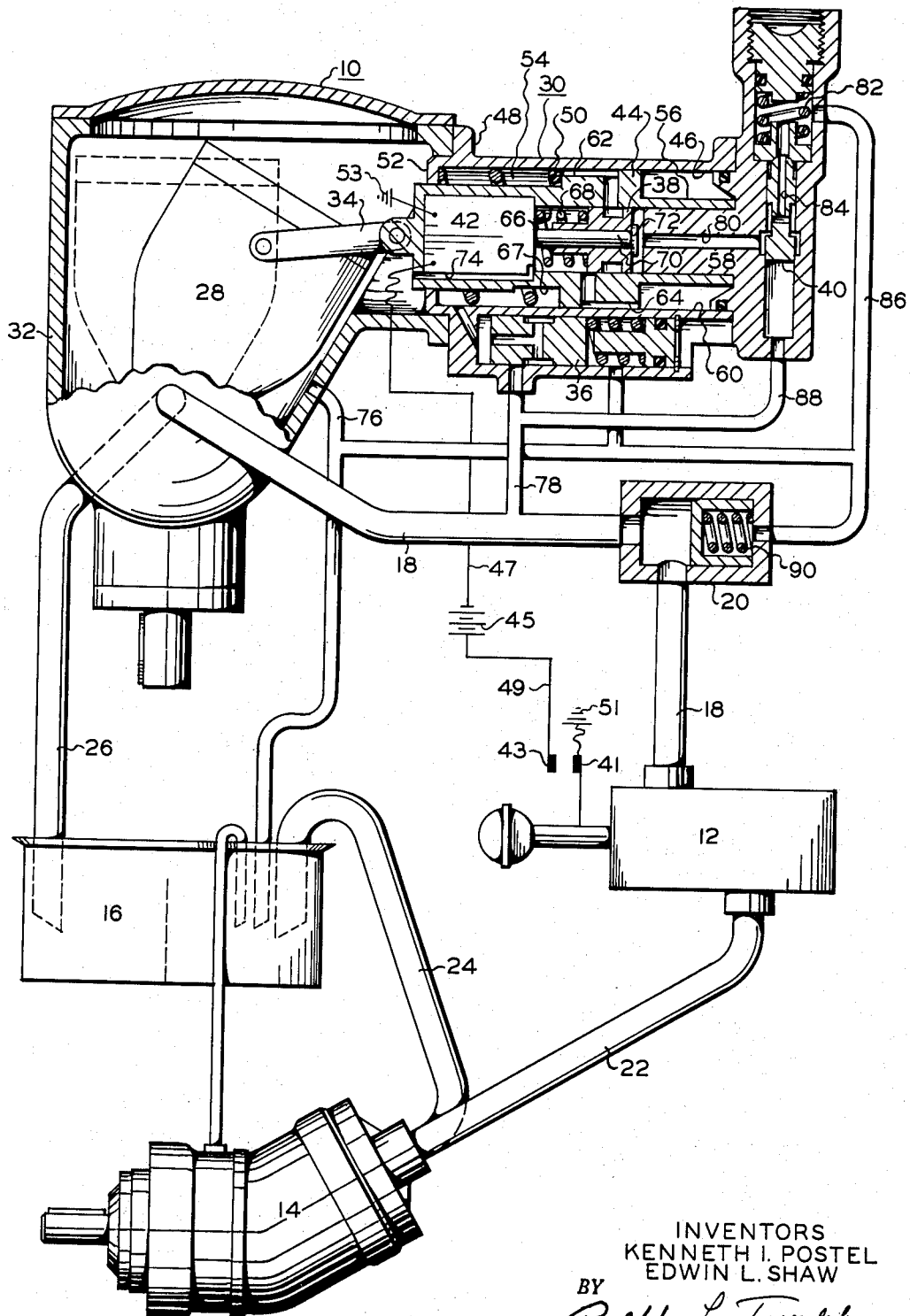

2,741,989

POWER TRANSMISSION

Kenneth I. Postel, Detroit, Mich., and Edwin L. Shaw, Columbus, Ohio, assignors to Vickers Incorporated, Detroit, Mich., a corporation of Michigan Application September 8, 1951, Serial No. 245,728

14 Claims. (Cl. 103—38)

This invention relates to power transmissions, and is particularly applicable to those of the type comprising two or more fluid pressure energy translating devices, one of which may function as a pump and another as a fluid motor.

The invention particularly relates to a pressure compensating type volume control system, and the components thereof, for a variable displacement pump used in a power transmission such as described above.

Generally speaking, a pressure compensating control is a pump displacement varying device responsive to the pressure at the outlet side of the pump and operative to decrease pump displacement as such pressure exceeds a predetermined value.

The conventional pressure compensating control employs a piston mechanically coupled to vary the pump displacement and spring biased to a position such as to produce maximum pump displacement. Pump outlet pressure acts on the piston in opposition to the biasing spring and the assembled load of the spring governs the pressure at which displacement reduction starts. Several disadvantages of such a control are readily apparent. As the pump displacement is varied from maximum to minimum, the biasing spring must be correspondingly compressed and, due to the rate of the spring, the pump outlet pressure will increase very appreciably as the displacement decreases. In applications requiring a relatively flat cut-off, that is, a small pressure rise between the start of displacement reduction and minimum displacement, such a pressure increase is undesirable. A further disadvantage lies in the fact that even when pump displacement has been varied to the minimum, a quantity of oil is being pumped as leakage and this oil is being pumped at maximum system pressure with consequent power waste and heating effect.

An object of the present invention is to provide a pressure compensating control for a variable displacement pump which will vary the pump displacement from maximum to minimum while maintaining the pump outlet pressure at a practically constant value.

A further object is to provide a control of the type mentioned above, with which the pump can be selectively caused to assume a very small displacement, thus reducing the pump outlet pressure to a point where power loss is negligible.

It is also an object to provide such a control system in which, while the pump is being held at small stroke and low output pressure, a quantity of oil other than leakage circulates through the pump case to provide cooling.

Another object is to provide, in such a control system, means for blocking the high pressure line from the pump to the load, while the pump is being held at minimum stroke and low outlet pressure, so as to prevent loss of fluid in case of rupture of the high pressure line.

An additional object is to provide such a control system which is particularly suited to aircraft applications by reason of compactness and light weight.

Further objects and advantages of the present invention will be apparent from the following description, reference being had to the accompanying drawing wherein a preferred form of the present invention is clearly shown.

In the drawing:

The single figure is a diagrammatic view of a power transmission system incorporating a preferred form of the present invention.

The transmission illustrated comprises a prime mover, not shown, driving a variable displacement pump generally designated 10, a two-way valve 12, a fluid motor 14 driving a load not shown, and a tank 16.

A pressure delivery conduit 18 connects pump 10 to one port of the two-way valve 12. Inserted in conduit 18 is a piston type check valve 20 whose function is considered below. Motor conduit 22 hydraulically connects the second port of two-way valve 12 to the fluid motor 14 and motor tank conduit 24 leads to tank 16. Suction conduit 26 completes the power portion of the circuit by supplying operating fluid to pump 10 from tank 16.

The variable displacement pump 10 is of the type employing axially reciprocable pistons in a rotary cylinder barrel mounted in a swinging yoke 28. The degree of deflection of yoke 28 determines the stroke of the pistons and hence the displacement of the pump. In other words, with yoke 28 in the position shown by the solid lines, pump displacement is a maximum and with yoke 28 in the position shown by the dotted lines, pump displacement is zero. For any intermediate position, the pump displacement is directly proportional to the sine of the yoke deflection angle.

The pressure compensating control, generally designated 30, is mounted on the housing 32 of pump 10 and is connected to the yoke 28 by a link 34. Basically, the compensating control 30 comprises five elements: a pressure reducing valve 36; a pilot valve 38; a second pilot valve 40; a solenoid 42; and a differential operating piston 44.

Differential piston 44 is slidably mounted in a cylinder bore 46 of the control body 48 and is biased by spring 50 in a direction to produce full deflection of yoke 28. The rod end of differential piston 44 passes through, in fluid sealing engagement with, an annular inwardly extending flange 52 at the end of cylinder bore 46, thus defining an annular pressure chamber 54.

A recess 67 is so positioned in the rod end of differential piston piston 44 that it passes through the annular flange 52 at a small yoke deflection, as later discussed, to provide a restricted passage from pressure chamber 54 to the interior of pump housing 32.

The head end of differential piston 44 is provided with a projecting sleeve 56 that slides in fluid sealing engagement on a fixed pilot 58, which pilot and cylinder 46 define a second annular pressure chamber 60. The pressure effective areas of the sides of piston 44 exposed to pressures in chambers 54 and 60 are so proportioned that with equal pressures in each chamber the piston 44 will move to the left, and thus move the yoke 28 toward its neutral position. Two passages 62 and 64 connect pressure chambers 54 and 60, respectively, to a bore 66 in piston 44 in which the pilot valve 38 is slidably mounted. Valve 38 is biased by a spring 68 to a position such that passages 62 and 64 are isolated from each other, but is operable by means later described to connect the two passages.

Solenoid 42 is mounted in differential piston 44 in fixed relation therewith, and a cylindrical armature extension 70 passes through pilot valve 38 and carries at its outer end an abutment means 72. Pilot valve 38 encircles extension 70 in sliding and fluid sealing engagement therewith. Abutment means 72 restrains pilot valve 38 against the biasing force of spring 68 and defines the normal position of pilot valve 38 relative to differential piston 44. In this normal position, pressure chambers 54 and 60 are isolated from each other, and pressure chamber 60 is vented to tank through passage 64, bore 66, passage 74, and the pump housing tank connection 76. Energization of solenoid 42 coerces pilot valve 38 to the left against spring 68 and effects communication between passages 62 and 64 and, consequently, pressure chambers 54 and 60, at the same time isolating passage 64 from the vent to tank.

Energization of solenoid 42 is effected on movement of the spool of valve 12 to the left or closed position. Contact point 41 is adapted to move with the spool of valve 12 and, upon closure of valve 12, meets fixed contact point 43 thus completing an electrical circuit comprising a source of current 45, leads 47 and 49, the solenoid winding, and ground connections 51 and 53. Lead 47 is provided with sufficient length inside pump case 32 to permit free full movement of piston 44. An independent manual switch could, of course, also be used.

The pressure reducing valve 36 is of conventional design and maintains a control pressure of say 100 p. s. i. in pressure chamber 54. High pressure fluid is supplied to reducing valve 36 by a conduit 78 tapped into pressure delivery conduit 18 on the upstream side of check valve 20.

Pilot valve 40 is conventional in design and operation and controls the admission of pressure fluid into passage 80 in fixed pilot 58. Pilot valve 40 is biased by the adjustable load of a spring 82 to a position such that passage 80 is normally vented to tank through a passage 84 in the pilot valve 40 and a drain conduit 86. High pressure oil from pressure delivery conduit 18, upstream of check valve 20, is delivered to pilot valve 40 through conduit 88 and acts on valve 40 in opposition to spring 82. When the pressure on valve 40 reaches a high predetermined value, say 3000 p. s. i., valve 40 shifts against the force of spring 82 and in so doing blocks flow through passage 80 to tank and instead, ports pressure fluid into passage 80. This pressure fluid acts on pilot valve 38 to shift it to the left against spring 68 and thus place pressure chambers 54 and 60 in mutual communication. As stated above, when equal pressures exist in chambers 54 and 60 the piston 44 is moved to the left and the deflection of yoke 28 is reduced.

Piston type check valve 20 is biased by a spring 90 to a normally closed position in which delivery conduit 18 is blocked. As pump 10 builds up a low pressure of, for example, 100 p. s. i., spring 90 is overcome and check valve 20 opens, permitting free passage of fluid in delivery conduit 18.

In operation of the system, with the components in the positions shown, pump 10 is delivering its full capacity to the fluid motor 14 which drives the load. The load resistance is such that the fluid pressure required to drive motor 14 at the speed induced by full flow of pump 10 is less than the cracking pressure of pilot valve 40. Now, assuming an increase in the load resistance, if motor 14 is to maintain the speed induced by full pump flow, the power supplied must increase. Since pump 10 is already operating at its maximum flow capacity and any power increase must be derived from an increase in operating pressure, the system pressure tends to rise causing pilot valve 40 to open and port pressure fluid through passage 80, thus exerting force on pilot valve 38. Pilot valve 38 shifts to the left placing pressure chambers 54 and 60 in communication with each other, resulting in leftward movement of piston 44 and reduced deflection of yoke 28. Motor 14 now slows in response to reduced pump displacement, the pressure requirement is reduced and a balance is achieved with pump 10 delivering at full pressure and reduced displacement. Incremental increases in load will cause corresponding reduction in pump displacement until the motor is finally stalled and requires no fluid delivery from the pump. At this time the pump 10 is maintaining the high 3000 p. s. i. pressure but is doing no useful work. Under these conditions the compensating control will have moved yoke 28 to a deflection such that only leakage is actually being pumped. However, due to the high pressures involved, leakage and deflections of pump components due to high compressive and tensile loads are quite appreciable and result in a yoke deflection which may be of the order of about 2½°. At this deflection, relief 67 in the rod end of differential piston 44 has not yet become operative to provide a passage from pressure chamber 54 to the pump housing 32.

If valve 12 is shifted to the left so as to isolate conduits 18 and 22, a condition analogous to the stalled motor would result and considerable power would be wasted by pumping leakage against maximum system pressure. This is avoided since shifting valve 12 to the left also energizes solenoid 42. Upon energization, solenoid 42 becomes operative to move pilot valve 38 to the left, regardless of system pressure, and yoke 28 is moved toward minimum deflection as described above.

Since a very low pressure of the order of 75 p. s. i. is required to compress spring 50 to the zero displacement position and since leakage and deflection of pump parts at such low pressures are practically negligible, yoke 28 will tend to move to a deflection of less than the 2½° mentioned above. Recess 67 is so positioned on differential piston 44 that at a yoke deflection of slightly less than this 2½° it passes through annular flange 52 providing a restricted passage from pressure chamber 54 into pump housing 32. The pump yoke 28 will now seek equilibrium at a deflection such that the pump output, virtually all of which now flows through recess 67 to the pump housing 32 and then to tank, will maintain a pressure drop across recess 67 sufficient to balance the load of spring 50. This flow provides cooling for the pump 10.

As mentioned above, piston type check valve 20 requires a low pressure of about 100 p. s. i. to cause it to open. Since, when solenoid 42 is energized the pump outlet pressure is of the order of 75 p. s. i., check valve 20 will close, thus preventing any fluid from passing beyond check valve 20.

To again supply pressure fluid to motor 14, valve 12 is shifted to the right, placing conduits 18 and 22 in communication and de-energizing solenoid 42. System operation again becomes as first described.

It will be seen from the foregoing that the present invention provides a control system for use with a variable displacement pump which will vary the pump displacement from maximum to minimum while maintaining a virtually constant pump outlet pressure, which provides for optional small displacement low pressure operation during periods of no load demand, and which provides for circulation of cooling oil during low pressure small displacement operation while at the same time blocking the pump outlet line to prevent loss of fluid in case of rupture of the outlet line.

While the form of embodiment of the invention as herein disclosed constitutes a preferred form, it is to be understood that other forms might be adopted, all coming within the scope of the claims which follow.

What is claimed is as follows:

1. In a volume control for a variable displacement pump, the combination of: a member movable to vary the displacement of said pump; a first pilot valve responsive to pump outlet pressure; a second pilot valve responsive to pressure fluid ported to it by said first pilot valve; a differential piston connected to said movable member of the pump; means forming pasages hydraulically connected to the opposing sides of said differential piston, said passages being controlled by said second pilot valve to selectively hydraulically connect or isolate said two opposing piston sides; a source of pressure fluid which continually supplies one side of said differential piston with control oil; and means operative to shift said second pilot valve irespective of pump outlet pressure.

2. In a volume control for a variable displacement pump, the combination of: a member movable to vary the displacement of said pump; a first pilot valve responsive to pump outlet pressure; a second pilot valve responsive to pressure fluid ported to it by said first pilot valve; a differential piston connected to said movable member of the pump; means forming passages hydraulically connected to the opposing sides of said differential piston, said passages being controlled by said second pilot valve to selectively hydraulically connect or isolate said two opposing piston sides; a source of pressure fluid which continually supplies one side of said differential piston with control oil; means operative to shift said second pilot valve irrespective of pump outlet pressure; and valve means in the pump outlet line operative to block the pump outlet line when the pump outlet pressure drops below a predetermined minimum.

3. In a volume control for a variable displacement pump: a member movable to vary the displacement of said pump; a differential piston connected to said movable member of the pump; a valve chamber contained in said differential piston; means forming fluid passages hydraulically connecting the opposing sides of said differential piston to said valve chamber; a first pilot valve slidably mounted in said valve chamber, cooperating with said fluid passages to effect the selective hydraulic communication or isolation of the opposing sides of said differential piston; and a second pilot valve subjected to pump outlet pressure and operative to pass pressure fluid to effect the shifting of said first pilot valve when the pump oulet pressure reaches a predetermined maximum value.

4. In a volume control for a variable displacement pump: a member movable to vary the displacement of said pump; a differential piston connected to said movable member of the pump; a valve chamber contained in said differential piston; means forming fluid passages hydraulically connecting the opposing sides of said differential piston to said valve chamber; a pressure responsive pilot valve slidable mounted in said valve chamber cooperating with said fluid passages to effect the selective hydraulic connection or isolation of the opposing sides of said differential piston; and a solenoid mounted in said differential piston and connected to said pilot valve, whereby the pilot valve may be moved by energization of said solenoid.

5. In a volume control for a variable displacement pump: a member movable to vary the displacement of said pump; a differential piston connected to said movable member of the pump; a valve chamber contained in said differential piston; means forming fluid passages hydraulically connecting the opposing sides of said differential piston to said valve chamber; a first pilot valve slidably mounted in said valve chamber, cooperating with said fluid passages to effect the selective hydraulic communication or isolation of the opposing sides of said differential piston; a second pilot valve subjected to pump outlet pressure and operative to pass pressure fluid to effect the shifting of said first pilot valve when the pump outlet pressure reaches a predetermined maximum value; and a solenoid mounted in said differential piston operative on energization to shift said first pilot valve irrespective of pump outlet pressure.

6. In a volume control for a variable displacement pump: a member movable to vary the displacement of said pump; a differential piston connected to said movable member of the pump to vary the stroke thereof; a cylindrical bore in said differential piston; fluid passages in said differential piston connecting the opposing sides of said differential piston to said cylindrical bore; a pilot valve slidably mounted in said cylindrical bore adapted to cooperate with said fluid passages to selectively connect or isolate the opposing sides of said differential piston; a fixed pilot extending into said differential piston in slidable and fluid sealing engagement therewith; a fluid passage in said fixed pilot whereby fluid may be admitted to or discharged from said cylindrical bore to move said pilot valve; and means responsive to the pump outlet pressure to selectively admit fluid to, or release fluid from, the passage in the fixed pilot and thereby govern the position of said pilot valve in said cylindrical bore.

7. In a volume control for a variable displacement pump: a member movable to vary the displacement of said pump; a differential piston connected to said movable member of the pump; a cylindrical bore in said differential piston; means forming fluid passages in said differential piston hydraulically connecting the opposing sides of said differential piston to said cylindrical bore; a pilot valve slidably mounted in said cylindrical bore adapted to cooperate with said fluid passages to selectively hydraulically connect or isolate the opposing sides of said differential piston; a fixed pilot extending into said differential piston in slidable and fluid sealing engagement therewith; a fluid passage in said fixed pilot whereby fluid may be admitted to or discharged from said cylindrical bore to move said pilot valve; means responsive to the pump outlet pressure to selectively admit fluid to, or release fluid from, the passage in the fixed pilot and thereby govern the position of said pilot valve in said cylindrical bore; a solenoid fixedly mounted in said differential piston; a cylindrical operating rod adapted to be moved by the solenoid armature and passing through said pilot valve in fluid sealing slidable engagement therewith; and abutment means on said operating rod outward of said pilot valve whereby said pilot valve may be shifted upon energization of said solenoid.

8. In a volume control for a variable displacement pump: a case enclosing the working parts of the pump; a member movable to vary the displacement of said pump; a cylinder; a differential piston in said cylinder connected to said movable member of the pump; pressure chambers associated with the opposite sides of said differential piston; fluid passages connected to said pressure chambers; a pressure responsive pilot valve cooperating with said fluid passages to selectively hydraulically connect or isolate said pressure chambers; means resiliently biasing said pilot valve to a normal position isolating said pressure chambers from each other; means responsive to pump outlet pressure to pass pressure fluid to shift said pilot valve; secondary means for shifting said pilot valve irrespective of pump outlet pressure; a reducing valve in communication with the pump outlet, the reduced pressure outlet of which continuously supplies one side of said differential piston with control fluid; and means forming a passage from one of said pressure chambers to the pump case, opened by movement of said differential piston to a predetermined point in its travel, said predetermined point being at some smaller stroke angle of the pump than the stroke angle assumed at full pressure and zero delivery.

9. In a volume control for a variable displacement pump, the combination of: a member movable to vary the displacement of said pump; a first pilot valve responsive to a predetermined maximum pump outlet pressure; a second pilot valve responsive to pressure fluid ported to it by said first pilot valve; piston means connected to said movable member and shiftable in response to pressure fluid ported thereto by said second pilot valve to shift said movable member to reduce said pump displacement; and operating means connected to said second pilot valve and operative to shift said second pilot valve irrespective of pump outlet pressure.

10. In a volume control for a variable displacement pump, the combination of: a member movable to vary the displacement of said pump; a first pilot valve responsive to a predetermined maximum pump outlet pressure;

a second pilot valve responsive to pressure fluid ported to it by said first pilot valve; piston means connected to said movable member and shiftable in response to pressure fluid ported thereto by said second pilot valve to shift said movable member to reduce said pump displacement; operating means connected to said second pilot valve and operative to shift said second pilot valve irrespective of pump outlet pressure; and a pressure responsive valve in the pump outlet line for blocking said outlet line during low pressure pump operation induced by said operating means.

11. In a volume control for a variable displacement pump, the combination of: a case enclosing the working parts of said pump; a member movable to vary the displacement of said pump; a first pilot valve responsive to a predetermined maximum pump outlet pressure; a second pilot valve responsive to pressure fluid ported to it by said first pilot valve; piston means connected to said movable member and shiftable in response to pressure fluid ported thereto by said second pilot valve to shift said movable member to reduce said pump displacement; operating means connected to said second pilot valve and operative to shift said second pilot valve irrespective of pump outlet pressure; and a bypass passage between the pump outlet and pump case, said bypass including an opening formed by movement of said piston means to a predetermined point in its path of travel reached only during small displacement, low pressure, operation.

12. A volume control system, for use with a variable displacement pump, comprising in combination: a case enclosing the working parts of the pump; a member movable to vary the displacement of said pump; an actuating device connected to said movable member; control valve means responsive to pump outlet pressure to control said actuating device; supplemental control means for said actuating device to cause it to induce and maintain small displacement, low pressure operation; a by-pass passage between the pump outlet and pump case; and blocking means for said by-pass passage during high pressure operation throughout the full range of displacement variation, said blocking means being controlled by movement of said atcuating device to a predetermined point in its path of travel, for opening said by-pass passage only during small displacement, low pressure pump operation, for circulation of cooling oil.

13. A volume control system, for use with a variable displacement pump, comprising in combination: a case enclosing the working parts of the pump; a member movable to vary the displacement of said pump; an actuating device connected to said movable member; control valve means responsive to pump outlet pressure to control said actuating device; supplemental control means for said actuating device to cause it to induce and maintain small displacement, low pressure operation; a by-pass passage between the pump outlet and pump case; blocking means for said by-pass passage during high pressure operation throughout the full range of displacement variation, said blocking means being controlled by movement of said actuating device to a predetermined point in its path of travel, for opening said by-pass passage only during small displacement, low pressure pump operation, for circulation of cooling oil; and a pressure responsive valve in the pump outlet line for blocking said outlet line during low pressure pump operation initiated by said supplemental control means.

14. A volume control system, for use with a variable displacement pump, comprising in combination: a member movable to vary the displacement of said pump; resilent means biasing said movable member toward maximum pump displacement; a fluid pressure actuating device connected to said movable member; control valve means responsive to pump outlet pressure to port fluid from the pump outlet to control said actuating device; supplemental operating means for operating said control valve means, irrespective of pump outlet pressure, to reduce pump displacement and thus reduce pump outlet pressure to only that low pressure necessary to overcome said resilient biasing means; and means in the pump outlet line blocking said outlet line and responsive to a higher pressure therein than said low pressure to open said outlet line.

References Cited in the file of this patent

UNITED STATES PATENTS

| | | |
|---|---|---|
| 2,299,234 | Snader et al. | Oct. 20, 1942 |
| 2,530,242 | Harrington | Nov. 14, 1950 |
| 2,571,758 | Purcell | Oct. 16, 1951 |
| 2,628,472 | Dray et al. | Feb. 17, 1953 |